US009330068B2

(12) United States Patent
Ellis et al.

(10) Patent No.: US 9,330,068 B2
(45) Date of Patent: *May 3, 2016

(54) METHOD FOR CONVERSION OF WEBSITE CONTENT

(71) Applicant: Go Daddy Operating Company, LLC, Scottsdale, AZ (US)

(72) Inventors: Guy Ellis, Scottsdale, AZ (US); Rajinder Nijjer, Phoenix, AZ (US); Robert Kelley, Scottsdale, AZ (US); Rajatish Mukherjee, Sunnyvale, CA (US); Josh Berk, Scottsdale, AZ (US); Aaron Silvas, Phoenix, AZ (US); Daniel Hardy, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 323 days.

This patent is subject to a terminal disclaimer.

(21) Appl. No.: 13/797,153

(22) Filed: Mar. 12, 2013

(65) Prior Publication Data

US 2014/0208197 A1 Jul. 24, 2014

Related U.S. Application Data

(60) Provisional application No. 61/755,918, filed on Jan. 23, 2013.

(51) Int. Cl.
*G06F 17/00* (2006.01)
*G06F 17/21* (2006.01)
*G06F 17/22* (2006.01)

(52) U.S. Cl.
CPC ............ *G06F 17/212* (2013.01); *G06F 17/211* (2013.01); *G06F 17/2247* (2013.01)

(58) Field of Classification Search
CPC .............................. G06F 17/211; G06F 17/212
See application file for complete search history.

(56) References Cited

U.S. PATENT DOCUMENTS

| | | | |
|---|---|---|---|
| 5,845,299 A * | 12/1998 | Arora et al. .................... 715/209 |
| 5,983,351 A | 11/1999 | Glogau | |
| 6,263,352 B1 | 7/2001 | Cohen | |
| 6,826,553 B1 * | 11/2004 | DaCosta .......... G06F 17/30867 |
| 6,915,482 B2 * | 7/2005 | Jellum ................ G06F 17/3089 |
| | | | 707/999.004 |
| 7,111,229 B2 | 9/2006 | Nicholas et al. | |
| 7,162,526 B2 * | 1/2007 | Dutta et al. .................... 709/229 |

(Continued)

OTHER PUBLICATIONS

Yang, Stephen J.H., et al, "A Unit of Information-Based Content Adaptation Method for Improving Web Content Accessibility in the Mobile Internet," ETRI Journal, vol. 29, No. 6, Dec. 2002, pp. 794-807.*

(Continued)

*Primary Examiner* — Laurie Ries
(74) *Attorney, Agent, or Firm* — Quarles & Brady LLP

(57) ABSTRACT

A system and method for converting website content is presented. Design elements in a graphical representation of a web page are identified. The design elements are ordered according to a position of each of the design elements with respect to a top of the graphical representation of the web page. One or more of the ordered design elements are grouped into one or more groups of design elements, and the design elements are stacked by rearranging each group of design elements into a single column. The single column of the groups of design elements are rendered into a converted web page for display on a device. In one implementation, the device is a mobile device.

20 Claims, 10 Drawing Sheets

(56) References Cited

U.S. PATENT DOCUMENTS

| | | | |
|---|---|---|---|
| 7,236,982 B2* | 6/2007 | Zlatanov et al. | |
| 7,246,305 B2 | 7/2007 | Batres | |
| 7,500,182 B2 | 3/2009 | Kelly | |
| 7,500,183 B2 | 3/2009 | Kelly | |
| 7,523,395 B1* | 4/2009 | Namait | G06F 17/246 715/212 |
| 7,743,334 B2 | 6/2010 | Rider | |
| 7,788,130 B2 | 8/2010 | Feeley et al. | |
| 7,983,924 B2 | 7/2011 | Garrison | |
| 8,291,313 B1* | 10/2012 | Monikandan | 715/244 |
| 8,356,090 B2 | 1/2013 | Parsons et al. | |
| 8,762,556 B2* | 6/2014 | Priyadarshan et al. | 709/230 |
| 2001/0034646 A1 | 10/2001 | Hoyt et al. | |
| 2002/0143659 A1 | 10/2002 | Keezer et al. | |
| 2002/0194373 A1 | 12/2002 | Choudhry | |
| 2003/0048296 A1* | 3/2003 | Cullen | G06F 17/30893 715/744 |
| 2003/0208578 A1 | 11/2003 | Taraborelli et al. | |
| 2004/0049587 A1 | 3/2004 | Henaff et al. | |
| 2004/0104944 A1* | 6/2004 | Koay | G06F 3/0489 715/827 |
| 2004/0133440 A1 | 7/2004 | Carolan et al. | |
| 2004/0148229 A1 | 7/2004 | Maxwell | |
| 2004/0249978 A1 | 12/2004 | Marappan et al. | |
| 2005/0097458 A1* | 5/2005 | Wilson | G06F 17/243 715/252 |
| 2005/0108325 A1 | 5/2005 | Ponte | |
| 2005/0268214 A1* | 12/2005 | Lu | G06F 17/30905 715/207 |
| 2006/0168506 A1* | 7/2006 | Endo et al. | 715/500.1 |
| 2006/0174199 A1 | 8/2006 | Soltis et al. | |
| 2006/0200751 A1 | 9/2006 | Underwood et al. | |
| 2007/0299682 A1 | 12/2007 | Roth et al. | |
| 2008/0010139 A1 | 1/2008 | Elmer et al. | |
| 2008/0059348 A1 | 3/2008 | Glassman et al. | |
| 2008/0082911 A1* | 4/2008 | Sorotokin et al. | 715/236 |
| 2008/0126170 A1 | 5/2008 | Leck et al. | |
| 2008/0250009 A1* | 10/2008 | Xie et al. | 707/5 |
| 2008/0307339 A1 | 12/2008 | Boro et al. | |
| 2009/0094379 A1 | 4/2009 | Lu et al. | |
| 2009/0132487 A1 | 5/2009 | Lev | |
| 2009/0199085 A1* | 8/2009 | Park | 715/234 |
| 2009/0216577 A1 | 8/2009 | Killebrew | |
| 2009/0327231 A1 | 12/2009 | Zappa et al. | |
| 2010/0042487 A1 | 2/2010 | Barazani | |
| 2010/0042927 A1 | 2/2010 | Kim | |
| 2010/0211467 A1* | 8/2010 | Ramanathan | 705/14.72 |
| 2013/0033448 A1* | 2/2013 | Yano et al. | 345/173 |
| 2013/0339840 A1* | 12/2013 | Jain et al. | 715/234 |

OTHER PUBLICATIONS

Gardner, Brett S., "Responsive Web Design: Enriching the User Experience," Sigma Noblis, vol. 11, No. 1, Oct. 2011, pp. 1-52 (plus cover sheet and back).*

"4imprint Blue Papers," downloaded from http://info.4imprint.com/wp-content/uploads/1P-7-0311-April-Blue-Paper-Web-Redesign.pdf?0feb34, pp. 1-17, 2011.*

Internet print-out of http://web.archive.org/web/20000901042248/http://www.datex.net/ecommerce/glossary.htm, Internet archive of datex.net, Sep. 1, 2000.

WiredAlumni, PR Newswire, Jun. 1, 2000.

Go Daddy Software, Oct. 2, 2002, www.archive.org, at http://web.archive.org/web/20021002232511/www.godaddy.com/gdshop/default.asp?e=com.

Go Daddy Software: WebSite Complete v 5.0, Dec. 10, 2002, www.archive.org, at http://web.archive.org/web/20021210150241/www.godaddy.com/gdshop/websitecomplete.asp?isc=&se=+&from_app=.

Review of Personalization Technologies: Collaborative Filtering vs. ChoiceStream's Attributized Bayesian Choice Modeling. ChoiceStream. http://www.choicestream.com/pdf/ChoiceStream_TechBrief.pdf. Apr. 2004.

Website Personalization: An Empirical Study of Novice and Expert Users on MyYahoo.com. http://www.doug-info.com/papers/personalization.htm. Fall 2000.

Personalization is Over-Rated. http://www.useit.com/alertbox/981004.html. Oct. 4, 1998.

Novice vs. Expert Users. http://www.useit.com/alertbox/20000206.htm. Feb. 6, 2000.

Intranet Portals: A Tool Metaphor for Corporate Information. http://www.useit.com/alertbox/20030331.html. Mar. 31, 2003.

The personalization story. ITworld.com. http://www.itworld.com/Man/2676/ITW010511rosenberg/pfindex.html. May 11, 2001.

Copyright.gov; www.copyright.gov; Feb. 5, 2001.

Microsoft Computer Dictionary, 5th Edition, 2002, p. 383.

GoDaddy.com screen shot, http://web.archive.org/web/20030401091726/www.godaddy.com/gdshop/default.asp?e=com. Apr. 1, 2003.

www.GoDaddy.com screen shot, Dec. 6, 2002.

* cited by examiner

METHOD FOR CONVERSION OF WEBSITE CONTENT

CROSS-REFERENCE TO RELATED APPLICATIONS

This application claims priority to U.S. Provisional Patent Application No. 61/755,918, filed on Jan. 23, 2013, and entitled "CONVERTING AND TRANSFERRING WEBSITES."

This application is related to U.S. patent application Ser. No. 13/796,760, filed on Mar. 12, 2013, and entitled "SYSTEM FOR CONVERSION OF WEBSITE CONTENT."

FIELD OF THE INVENTION

The present invention generally relates to website design and communication, and more specifically, the present invention relates to systems and methods for efficiently and effectively providing website and website information to various requesters having differing operational constraints.

BACKGROUND OF THE INVENTION

The Internet comprises a vast number of computers and computer networks that are interconnected through communication links. The interconnected computers exchange information using various services. In particular, a server computer system, referred to herein as a web server, may connect through the Internet to a remote client computer system, referred to herein as a requesting device. The requesting device may request and receive, from the web server, websites containing one or more graphical and textual web pages of information. A request is made by visiting the website's address, known as a Uniform Resource Locator ("URL"). Upon receipt, the requesting device can display the web pages. The request and display of the websites are typically conducted using a browser. A browser is a special-purpose application program that effects the requesting of web pages and the displaying of web pages.

The information on web pages is in the form of programmed source code that the browser interprets to determine what to display on the requesting device. The source code may include document formats, objects, parameters, positioning instructions, and other code that is defined in one or more web programming or markup languages. One web programming language is HyperText Markup Language ("HTML"), and all web pages use it to some extent. HTML uses text indicators called tags to provide interpretation instructions to the browser. The tags specify the composition of design elements such as text, images, shapes, hyperlinks to other web pages, programming objects such as JAVA applets, form fields, tables, and other elements. By default, the browser processes HTML instructions in the order they are listed, so that elements appear on the web page according to the HTML processing flow. HTML can be used to establish design element positioning in combination with Cascading Style Sheets ("CSS") or a number of other technologies to ascribe either a relative or an absolute position of the element on the web page, as depicted on the requesting device. Relative positioning of an element retains the element within the HTML processing flow, simply moving the element a proscribed number of pixels horizontally or vertically away from the place the element otherwise would have appeared. In contrast, absolute positioning places the element a proscribed number of pixels from the top-left (or top-right in countries with right-to-left reading direction) corner of the web page. The element is removed from the HTML processing flow of the web page. The location of such an absolutely positioned element does not vary with page width and does not affect the positioning of elements around the element.

The display parameters of requesting devices may vary widely due to differences in screen size, resolution, processing power, and maximum download speeds. Formatting the web page to be properly displayed across a large number of requesting devices with different display parameters and bandwidth is a primary concern for web page designers. Historically, the most effective way to address this concern has been for the web page designer to manually create different formatting and style layouts for each expected set of requesting device parameters. For example, a designer would create a first web page to be displayed within a browser window on a standard computer monitor set at 1600×1200 resolution and using mouse and keyboard input for navigation. The designer would then create a second web page having the same or similar content as the first web page, but being formatted for display on a mobile device, such as a smart phone or tablet, which has a relatively constrained screen size and touch-screen navigation. This manual approach excessively duplicates design work and, due to the hard-coded formatting of each page, is susceptible to changes in requesting device display parameters. An automated web page conversion process that accommodates any requesting device would be advantageous.

One known programming approach, referred to as responsive web design ("RWD"), addresses this concern in some computing environments. RWD uses a particular set of programming language function calls to adapt the web page to the width and resolution of the requesting device's display. Such adaptation may include repositioning, resizing, and even completely eliminating design elements in order to fit the content into a new layout that accommodates the display. Unless adaptive layout decisions are made in advance by the web designer, thus obviating some automation of the processing, RWD may compromise the functional and informational goals of the web page as well as its aesthetic goals. Furthermore, RWD reformatting is particularly ill-suited for adapting web pages employing absolute positioning of elements because the reformatting is primarily determined by the width of the browser window, which does not affect absolutely-positioned elements.

DETAILED DESCRIPTION OF THE PREFERRED EMBODIMENT

Figure 1:
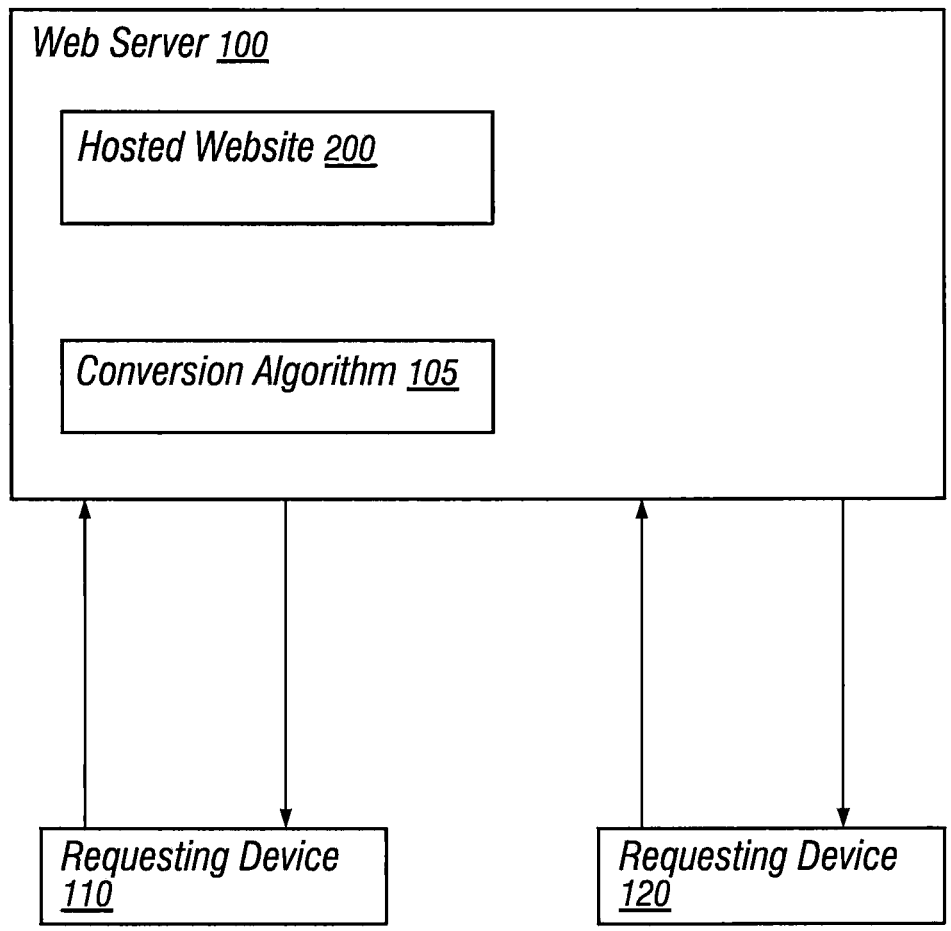
FIG. 1 is schematic diagram of a system and associated operating environment in accordance with the present disclosure.

The present invention overcomes the aforementioned drawbacks by providing a system and method for the conversion of a web page that is intended to be displayed on a requesting device with substantial resources into a web page that is intended to be displayed on a requesting device with constrained resources. The web server tasked with serving the web page to requesting devices, also known as a hosting provider, may perform one or more algorithms for the conversion. Alternatively, the web server may assign the conversion to a related computer system, such as another web server, collection of web or other servers, a dedicated data processing computer, or another computer capable of performing the conversion algorithms. In some cases, the requesting device will request and receive conventional web page data and then perform the conversion at the requesting device to convert the conventional web page into a web page more suited for display by the requesting device. For example, a web page renderer or layout engine operative on the requesting device may be configured to implement the present conversion method after a web page has been retrieved from a web server. For clarity of explanation, and not to limit the implementation of the present methods, the methods are described below as being performed by a web server that serves the web page to requesting devices. The conversion is described with a left-sided prioritization for left-to-right reading countries; it will be understood that left and right directions may be reversed for countries that read from right-to-left.

When performing the conversion, the web server evaluates the web page content as depicted in the web page's final graphical layout, rather than with respect to its source code. This enables the web server to convert the web page as described below while retaining the contextual significance of the web page elements, even if those elements are fixed or absolutely positioned on the web page. According to the methods described herein, the web server identifies the set or a subset of the design elements contained in the web page. The design elements are then sorted into a number of groups, based upon a number of criteria, as described below. Once the various design elements have been grouped, the groups of design elements can then be reorganized so as to be more appropriately positioned for display on the requesting device. When the requesting device is a mobile device, for example, having a limited display size, the groups of design elements may be rearranged so as to be more easily viewed on the mobile device. Similarly, design elements that include user interface elements, such as links, buttons, and the like, may be modified (e.g., by making the user interface elements larger, or more separated from one another) so as to be more easily accessible when the user interface elements are accessed using a touch screen display of a mobile requesting device.

In one implementation, the present invention is a system comprising a processor configured to identify design elements in a graphical representation of a web page, order the design elements according to a position of each of the design elements with respect to a top of the graphical representation of the web page, and group one or more of the ordered design elements into one or more groups of design elements. The processor is configured to stack the design elements by rearranging each group of design elements into a single column, and render the single column of the groups of design elements into a converted web page for display on a device.

In another implementation, the present invention is a system comprising a processor configured to identify design elements in a graphical representation of a web page, order the design elements according to a position of each of the design elements with respect to a top of the graphical representation of the web page, and group one or more of the ordered design elements into one or more groups of design elements. The processor is configured to stack the design elements in a single column, by moving each group of design elements to the left in the graphical layout of the webpage until the group being moved contacts a left side of the graphical layout of the web page or another group of design elements, and, upon contact with another group of design elements, placing the group being moved below the contacted group of design elements. The processor is configured to render the single column of the design elements into a converted web page for display on a device.

In another implementation, the present invention is a non-transitory computer-readable storage media storing instructions that, when executed by at least one computing device, cause the at least one computing device to identify design elements in a graphical representation of a web page, order the design elements according to a position of each of the design elements with respect to a top of the graphical representation of the web page, and group one or more of the ordered design elements into one or more groups of design elements. The instructions cause the at least one computing device to stack the design elements by rearranging each group of design elements into a single column, and render the single column of the groups of design elements into a converted web page for display on a device.

In another implementation, the present invention is a method comprising identifying design elements in a graphical representation of a web page, ordering the design elements according to a position of each of the design elements with respect to a top of the graphical representation of the web page, and grouping one or more of the ordered design elements into one or more groups of design elements. The method includes stacking the design elements by rearranging each group of design elements into a single column, and rendering the single column of the groups of design elements into a converted web page for display on a device.

In another implementation, the present invention is a method comprising identifying design elements in a graphical representation of a web page, ordering the design elements according to a position of each of the design elements with respect to a top of the graphical representation of the web page, and grouping one or more of the ordered design elements into one or more groups of design elements. The method includes stacking the design elements in a single column by moving each group of design elements to the left in the graphical layout of the webpage until the group being moved contacts a left side of the graphical layout of the web page or another group of design elements, and, upon contact with another group of design elements, placing the group being moved below the contacted group of design elements. The method includes rendering the single column of the design elements into a converted web page for display on a device.

In another implementation, the present invention is a method for generating a converted web page comprising receiving a request for a web page from a requesting device having a first display. The web page is designed to be served to a requesting device having a second display. A width of the second display is greater than a width of the first display. The method includes identifying one or more design elements in a graphical layout of the web page, ordering the design elements according to a proximity of each of the design elements to a top of the graphical depiction of the web page, and grouping one or more of the ordered design elements into one or more groups of design elements according to a column layout. The method includes stacking the design elements by rearranging each group of design elements into a single column, and setting a primary navigation interface by identifying one or more navigation elements on the web page, determining which of the identified one or more navigation elements are primary navigation elements, and inserting one or more of the primary navigation elements into the primary navigation interface. The method includes rendering the single column of the design elements into the converted web page, and rendering the primary navigation interface into the converted web page.

Rendering of the converted web page may take into account particular formatting rules or other rendering limitations for particular types of web page elements, examples of which are described below. The web server may create a primary navigation interface for the converted web page by scanning the original web page for navigation elements, designating as primary navigation elements the navigation elements with the most visible links, removing the primary navigation elements from the rendering process, and formatting and displaying some or all of the primary navigation elements as a static primary navigation interface on the converted web page.

Referring to FIG. 1, a requesting device with substantial resources 110 and a requesting device with constrained resources 120 are configured to communicate over the Internet with a web server 100 and may request one or more web pages 200 from the web server 100. In various implementations the web server 100, and requesting devices are computing devices, such as server computers, desktop or portable computers, mobile devices, distributed computing services, and the like. The requesting devices 110, 120 may request the web pages 200 using any electronic communication medium, communication protocol, and computer software suitable for transmission of data over the Internet. Examples include, respectively and without limitation: a wired connection, WiFi or other wireless network, cellular network, or satellite network; Transmission Control Protocol and Internet Protocol ("TCP/IP"), Global System for mobile Communications ("GSM") protocols, code division multiple access ("CDMA") protocols, and Long Term Evolution ("LTE") mobile phone protocols; and web browsers such as MICROSOFT INTERNET EXPLORER, MOZILLA FIREFOX, and APPLE SAFARI.

A requesting device with substantial resources 110 may be any requesting device for which web pages are typically designed without concern for display, user interface, processing, or Internet bandwidth limitations. Such requesting devices 110 include, without limitation, personal and workplace computing systems such as desktops, laptops, and thin clients, each with a monitor or built-in large display. A requesting device with constrained resources 120 may be any requesting device that cannot display the informational and functional content of web pages that are designed for viewing on personal computers and other requesting devices with substantial resources 110. Such requesting devices 120 include mobile devices such as mobile phones and tablet computers, and may further include other similarly limited devices for which conventional websites are not ordinarily designed. Mobile devices, and mobile phones in particular, have a significantly smaller display size than personal computers, and may further have significantly less processing power and, if receiving data over a cellular network, significantly less Internet bandwidth. In one embodiment, the requesting device with constrained resources 120 is a mobile phone having a display on which the original web page 200 cannot be satisfactorily displayed.

The web page 200 is designed primarily to be displayed on a monitor or other large display of a requesting device with substantial resources 110, and the web server 100 may serve the web page 200 to such requesting devices 110 without modification. The web server 100 includes a conversion algorithm 105 that the web server 100 uses as described below to convert the web page 200 so that it may be displayed more appropriately on a requesting device with constrained resources 120. The web server 100 may convert the web page 200 before any such requesting device 120 requests the web page 200, and may store a converted version of the web page 200 for serving to such requesting devices 120. For example, the web server 100 may both create the original web page 200 and convert the web page 200 with the conversion algorithm 105 when the creator of the web page 200 requests publication of the web page 200 to a website that is accessible over the Internet. In addition or alternatively, the web server 100 may convert the web page 200 upon receiving a request for the web page 200 from one or more such devices 120. The web server 100 may store or destroy the converted version after serving the converted version as requested.

In one embodiment, both the original and converted versions of the web page 200 may be served at the same URL. The web server 100 may determine whether the request for the web page 200 is from a requesting device with substantial resources 110 or a requesting device with constrained resources 120 before servicing the request. The web server 100 may detect the type of requesting device 110, 120, the type of browser, or another indicator to determine how to handle the request. For example, the web server 100 may inspect a user-agent string provided by the requesting device 110, 120 to identify one or more attributes of the requesting device 110, 120. Those attributes (such as operating system, browser, central processing unit (CPU), and the like) can then be used to determine the type of requesting device 110, 120 and, thereby, the version of the web page 200 to serve to the requesting device 110, 120. If the original and converted versions of the web page 200 are stored and available (for example, the converted version of the web page 200 may be created when the original version of the web page 200 was originally published, or as a step in the editing process of the original web page 200), the web server 100 uses the indicator (e.g., a value or combination of values present within the device's user-agent string) to determine whether to serve the original or converted version of the web page 200 to the requesting device 110, 120. In that case, the URL visited by the requesting device 110, 120 will not change. Instead, different versions of the web page 200 will be served to the requesting device 110, 120 depending upon the type of requesting device 110, 120 requesting the web page 200. If the web page 200 has not been previously converted and stored, the web server 100 uses the indicator to determine if it is necessary to convert the web page 200 and serve the converted version to the requesting device 110, 120. In alternative embodiments, the original and converted versions of the web page 200 may be served at different URLs. Either of the versions of the web page 200 may be accessed directly by the requesting device 110, 120 by typing the associated URL into the browser, or the web server 100 may detect the type of requesting device 110, 120, the type of browser, or another indicator to determine whether to redirect the requesting device's 110, 120 request to the original web page's 200 URL or the converted version's URL.

Figure 2:
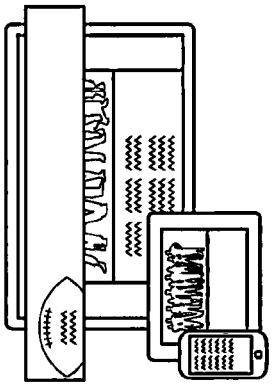
FIG. 2 is a schematic illustration of a web page having a plurality of elements intended to be displayed on a device with substantial resources.

FIG. 2 illustrates an example web page 200 in its final graphical layout. As depicted in FIG. 2, the web page 200 is suitable for display on a requesting device having substantial resources, such as requesting device 110 of FIG. 1. If, however, the web page 200 were to be displayed on a requesting device having limited resources, such as a mobile phone, the web page 200 would not be displayed in a manner making the web page 200 easily accessible to a user of the mobile device. For example, because web page 200 is relatively wide, if the entire width of the web page 200 were to be displayed upon the screen of a mobile device, the web page 200 would need to be depicted with relatively small font and image size in order to fit all of the design elements on the mobile device's screen, making the content of the web page 200 difficult to read or view. If, however, the user were to zoom-in on a particular portion of the web page 200, in order to make reading of the text in that portion more easily read, the web page 200 would become too large to depict on the display of the mobile device. Consequently, when zoomed-in, the user would need to pan the web page 200 both up and down and side-to-side in order to view all of the content of the web page 200.

The example web page 200 includes a number of design elements, including HTML paragraphs, text boxes, images, and shapes. The specific elements of the example web page are identified below with reference to FIG. 4. When converting the web page 200 for display on a device having limited resources, the conversion algorithm scans the elements of the web page 200, including invisible elements such as HTML link elements and hyperlink elements that are attached to specific visible elements. Those elements can then be rearranged and/or otherwise modify to generate a web page that can be more effectively displayed on the requesting device. In some cases, rather than analyze all the elements of the web page 200, the conversion algorithm only analyzes and modifies the display of visible elements of the web page 200 that must be moved to properly display the web page on a requesting device with constrained resources. Hyperlink elements can be treated as part of the element to which the hyperlink is attached.

Figure 3:
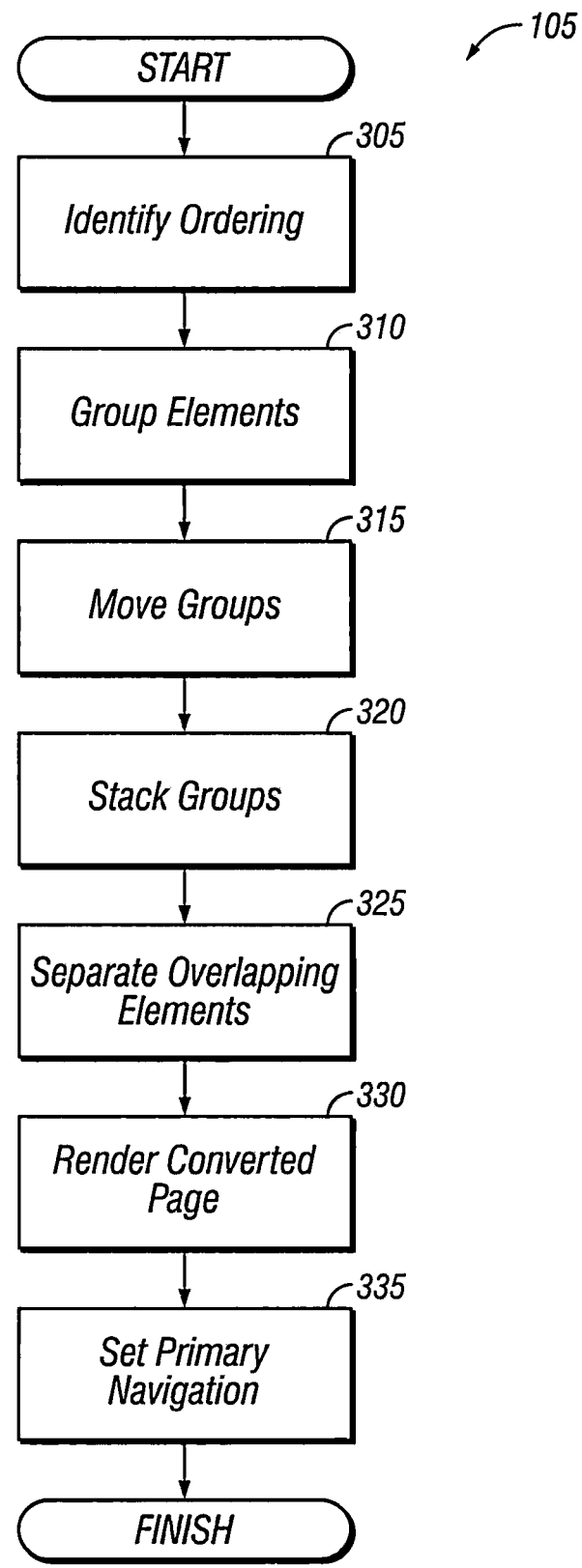
FIG. 3 is a flow diagram of a method for converting a web page intended to be displayed on a device with substantial resources into a web page intended to be displayed on a device with constrained resources.
Figure 4:
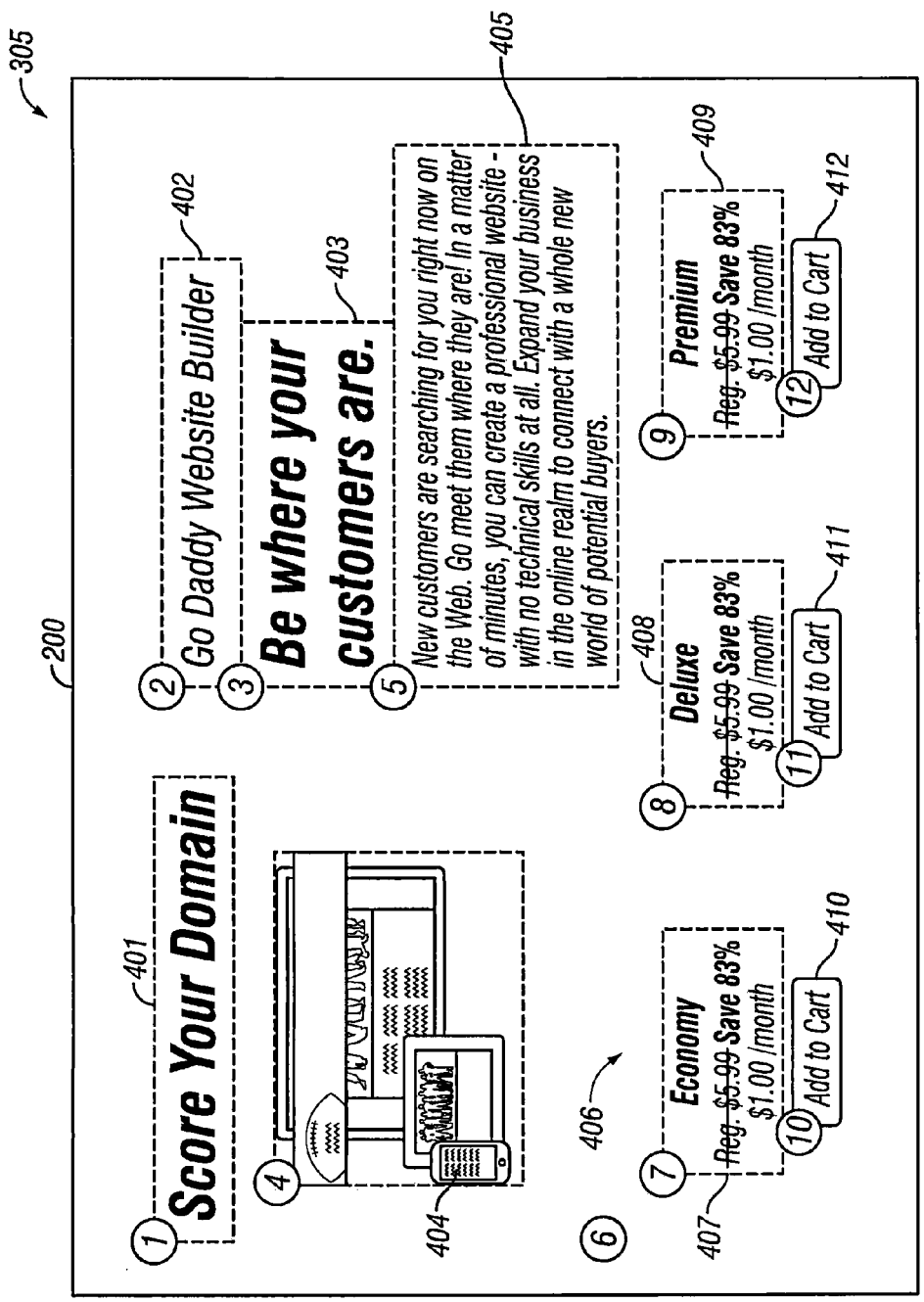
FIG. 4 is a schematic illustration of identifying the elements of the web page of FIG. 2.

FIG. 3 is a flow chart illustrating an example method of converting the web page 200 of FIG. 2 according to the conversion algorithm 105 for display on a requesting device having constrained resources. FIGS. 4-9 are illustrations demonstrating various ones of the steps of the method of FIG. 3. At step 305, the web server identifies each design element 401-412 to be processed in the conversion. In one embodiment, the web server may identify the elements 401-412 by rendering the web page 200 (for example, using a web browser engine or rendering engine) into a final graphical layout, and then analyzing the final graphical layout as rendered to identify the elements. In another embodiment, the web server may identify the elements 401-412 by retrieving identification and positioning data regarding each element 401-412 from a storage location, such as a design database. In still another embodiment, the web server may identify the elements 401-412 by analyzing the source code of the web page 200 to retrieve parameters, such as HTML tags or CSS parameters, for each design element 401-412. The identified design elements 401-412 are then organized in order of decreasing height as those elements would be display on the web page 200. The ordering of the design elements in the web page 200 is shown in FIG. 4, where each element is associated with a number from 1 to 12.

Height in this sense refers to the proximity of the top of an element 401-412 to the top of the web page 200: the higher the element, the closer that element is to the top of the web page 200. Most standard HTML elements, including text boxes, shapes, images, and tables, have a generally rectangular boundary that defines the space the element occupies on the web page. The top of such elements is the edge of the rectangular boundary that is closest to the top of the web page. For elements that do not have such an outline, step 305 may include defining a rectangular boundary for the element and using that rectangular boundary to perform the conversion algorithm 105. Elements at the same height are ordered from left to right.

Figure 5:
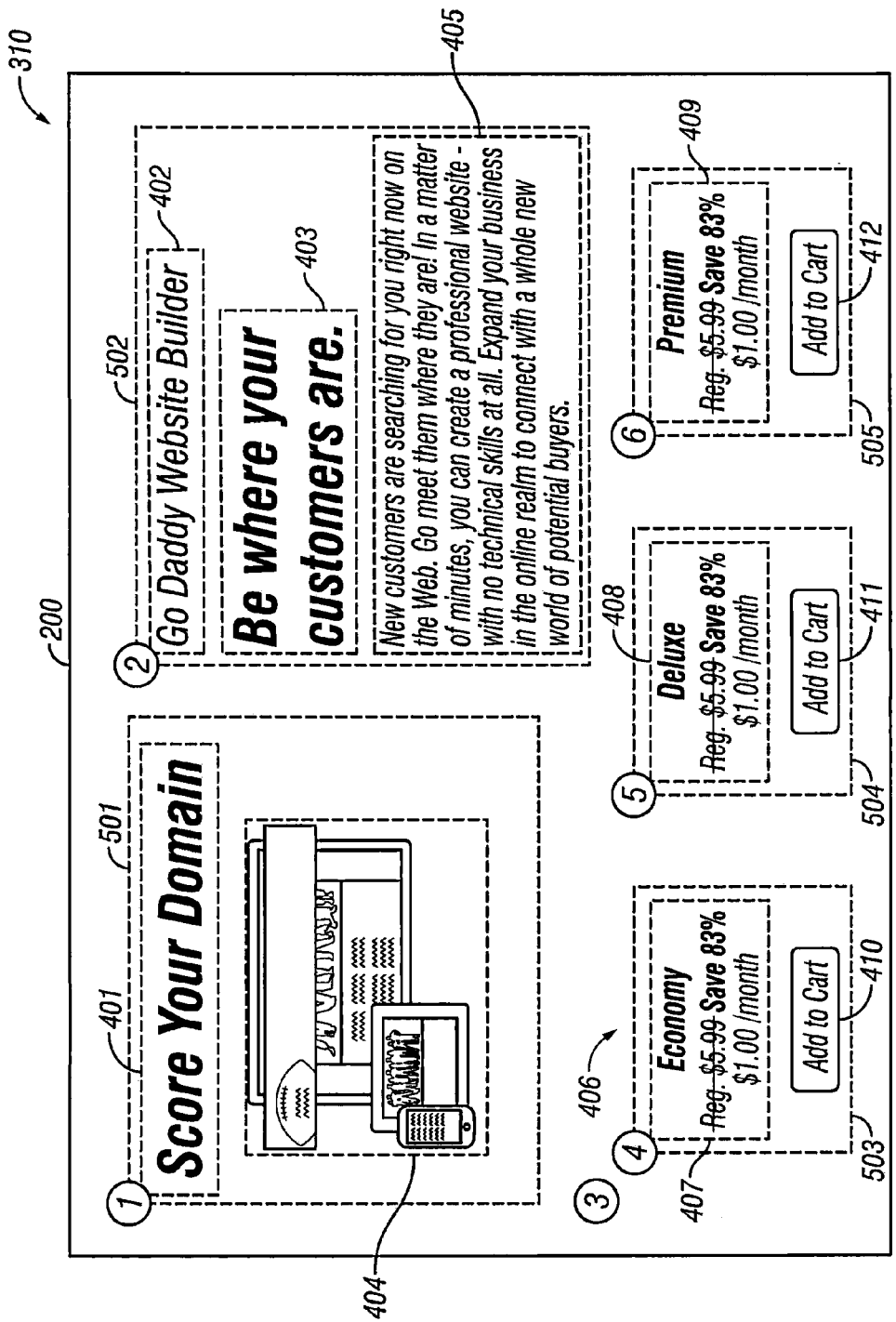
FIG. 5 is a schematic illustration of grouping the elements of the web page of FIG. 2.

At step 310, illustrated in FIG. 5, the web server groups the elements 401-412 into one or more element groups 501-505 according to a column layout. That is, the web server recognizes columnar, or vertically-aligned, arrangements of the elements 401-412 and attempts to group vertically-aligned elements according to preset rules. In one implementation, starting from the highest element 401, the web server scans below the element 401 for another element (e.g. element 404) that may be within a preset distance from the first element 401, such as about 200 pixels. If the element 404 is within the distance, the web server checks whether the element 404 is left-, right-, or center-aligned with the first element 401 within a preset tolerance, typically measured in number of pixels, such as about 20 pixels. If the element 404 is so-aligned, the web server checks that the element 404 is not wider than the first element 401 by a preset threshold, typically measured in pixels, such as about 200 pixels.

Scanning according to these parameters allows the web server to determine if it is contextually desirable to view the elements 401, 404 in close vertical proximity to each other in the converted web page. Thus, if the element 404 meets these criteria, a group 501 is formed containing the groupable elements 401, 404. If the element 404 does not meet these criteria, the element is a breaking element that terminates scanning for the present column of elements. Setting the alignment tolerance or width threshold too high or too low results in contextually inappropriate grouping or non-grouping of elements. Certain types of elements may be considered breaking elements even if they meet the criteria for grouping. For example, shape elements such as element 406 may be excluded from grouping due to shapes having no contextual value beyond serving as a background for other elements, such as elements 407-409. Shape elements may be treated by the web server as a breaking element for the present group, or they may be ignored by the web server in forming groups.

The web server continues scanning below each groupable element and adding elements to the group 501 until a breaking element (e.g., element 406) or the bottom of the web page 200 is reached. The web server then begins scanning another column of elements, starting with the next-highest element 402 that is not yet in a group. The web server continues scanning columns of elements and grouping groupable elements until all ordered elements 401-412 are contained in a group 501-505 or are determined to be ungroupable. Thus, in the example web page 200, elements 401 and 404 are contained in a group 501, elements 402, 403, and 405 are contained in a group 502, elements 407 and 410 are contained in a group 503, elements 408 and 411 are contained in a group 504, elements 409 and 412 are contained in a group 505, and element 406 cannot be grouped with any other elements.

Figure 6:
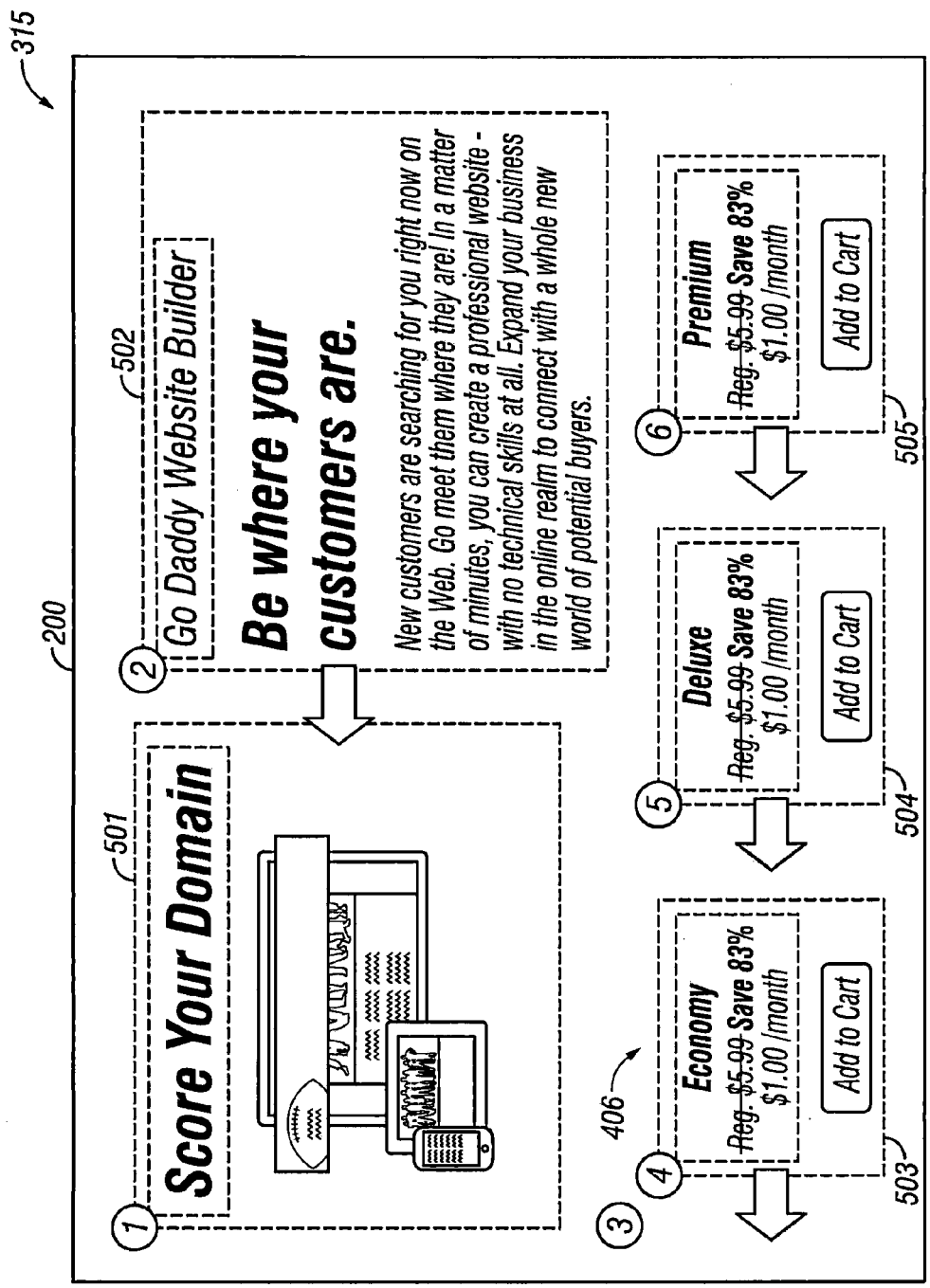
FIG. 6 is a schematic illustration of moving the groups of elements of the web page of FIG. 2.
Figure 7:
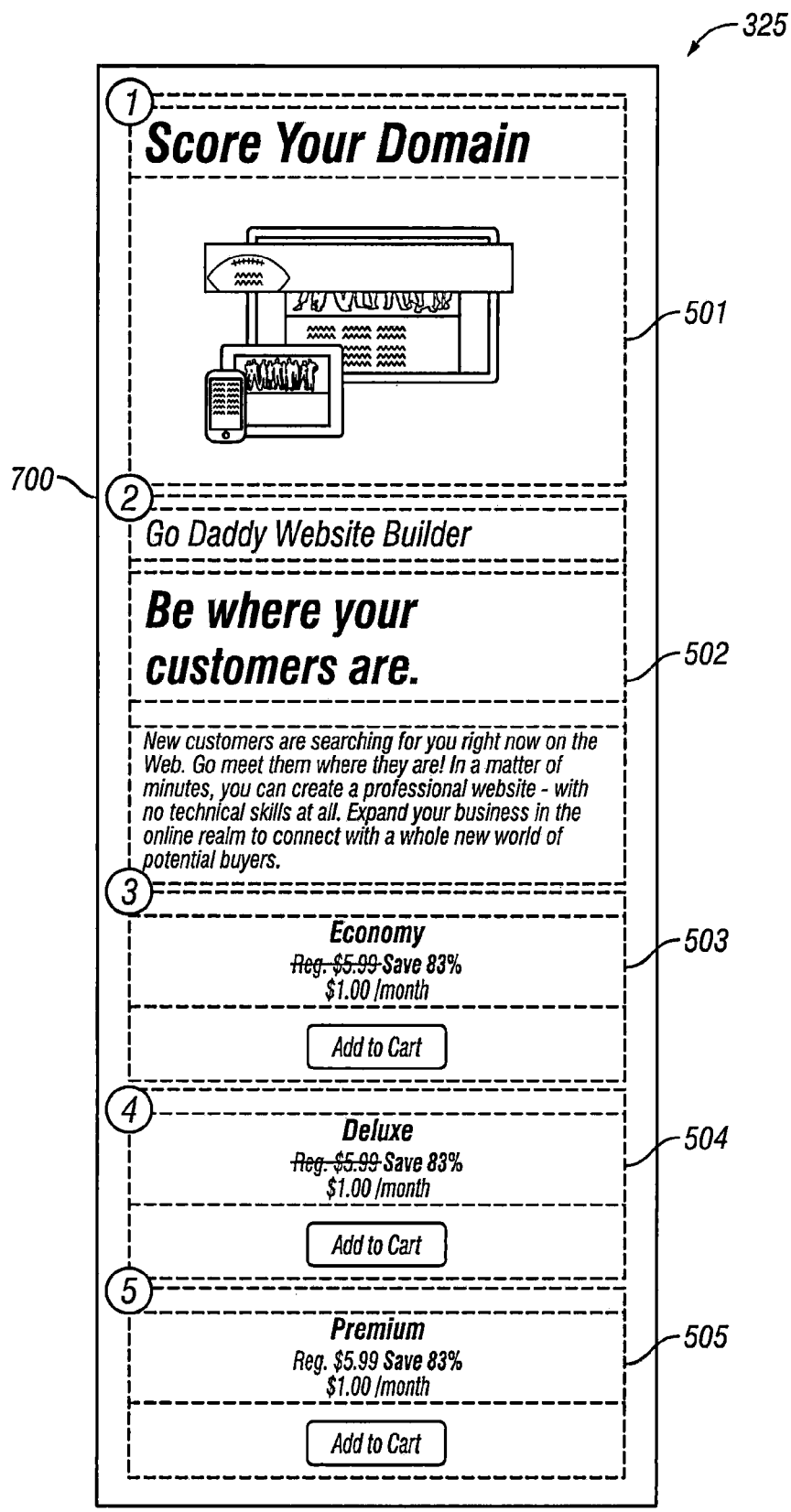
FIG. 7 is a schematic illustration of stacking the groups of elements of the web page of FIG. 2.

At step 315, illustrated in FIG. 6, each group 501-505 and each ungrouped element 406 is moved, in order of descending height, toward the left side of the web page 200. Movement continues until the left side of the group or ungrouped element being moved contacts the left side of the web page or the right side of another group or ungrouped element. When another group or ungrouped element is contacted, at step 320 the moving group is placed below the group that is contacted and moved to the left side of the web page 200. See FIG. 7. This gives priority positioning to the left-most group among a plurality of groups at the same height. The grouping and movement of steps 305-320 converts a multiple-column layout into a single-column layout 700 without loss of context or of informational and functional value of the content.

Figure 8:
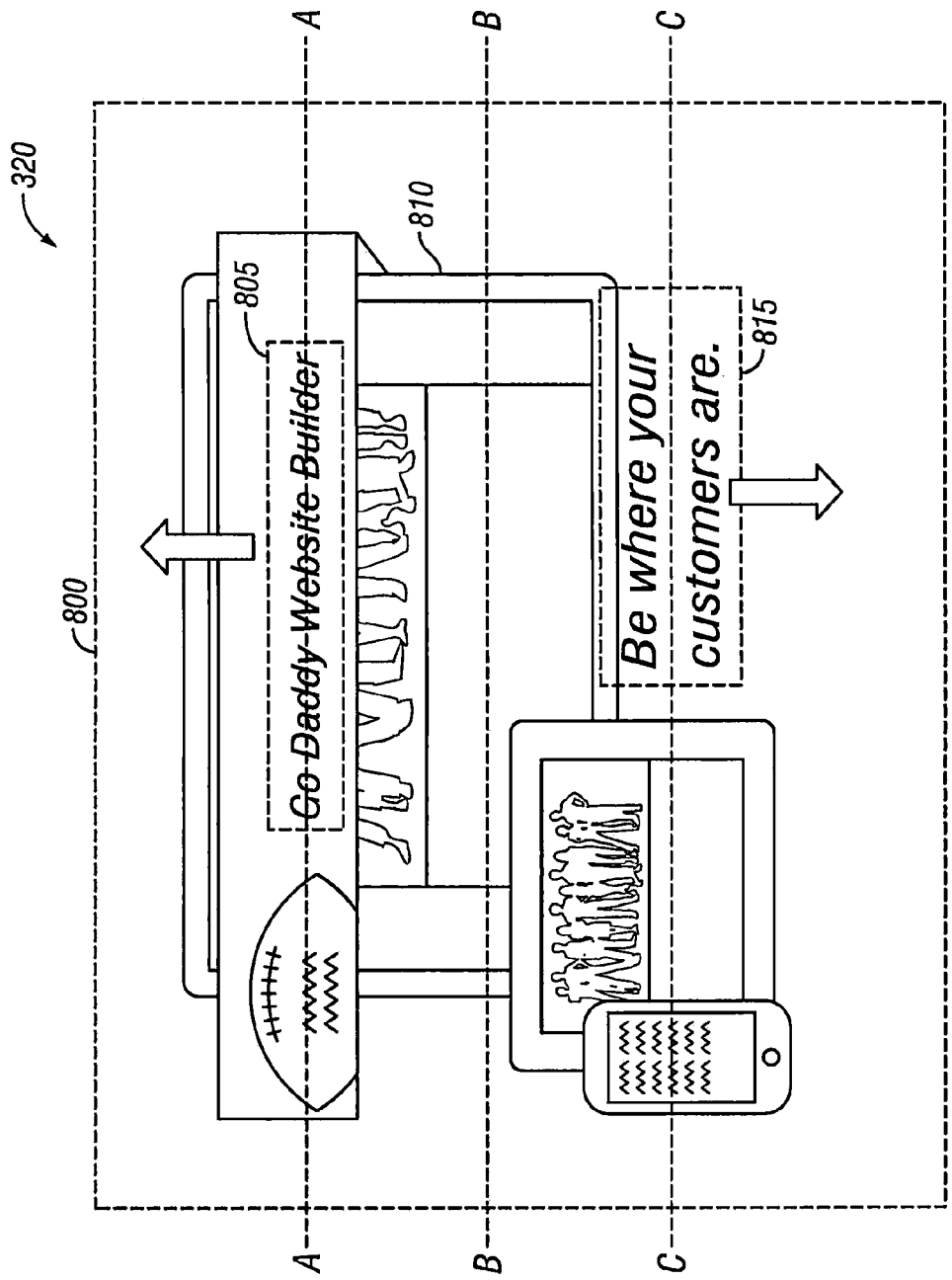
FIG. 8 is a schematic illustration of separating overlapping elements of a group.

At step 325, illustrated in FIG. 8, the web server separates overlapping elements within each group and among the ungrouped elements. An element overlaps another element if some or all of the area within its rectangular boundary occupies the same pixels as the area of the overlapped element. In the example group 800 of FIG. 8, elements 805 and 815 each overlap element 810. To separate the elements 805-815, the web server determines the vertical midpoint of each element 805-815, delineated by lines A-A, B-B, and C-C, respectively. Between two overlapping elements, the web server determines which element is higher, then determines which element's vertical midpoint is higher. If the higher of the two elements has a lower vertical midpoint than the lower of the two elements, as in elements 805 and 810, the lower element is separated from the higher element by placing the lower element above the higher element. If the higher of the two elements has a higher vertical midpoint than the lower of the two elements, as in elements 810 and 815, the lower element is placed below the higher element.

At step 330, the web server renders the elements 401-412 into containers according to the alignment of their groups 501-505 or ungrouped positioning. The rendering includes generating the source code for the converted web page as it will be displayed on the requesting device. See FIG. 9. The rendered containers are formatted according to preset rules. The rules include general rendering instructions and may further include exceptions to the general rules to accommodate particular types of design elements. In one implementation, the general rules include requirements that each container is center-aligned and has a maximum width equal to the width of the requesting device's display. The rules may further include several exceptions. A container for text elements, such as text boxes and paragraphs, has the same width as the display, regardless of the original width of the contained text elements. All text may be capped at a maximum or minimum size, with the text size being changed accordingly before rendering. Shape elements, such as element 406 of the example web page 200, are not directly rendered to the converted web page; the shape element is removed from the rendering flow and is instead rendered as a background for any element that completely overlaps the shape element in the original web page 200. In contrast, horizontal line elements are identified and rendered as any other visible element. Vertical line elements may be rendered if the web server identifies them as dividers between other rendered elements in a group. Navigation elements that are identified as primary navigation, as described below, are removed from the rendering flow.

Figure 9:
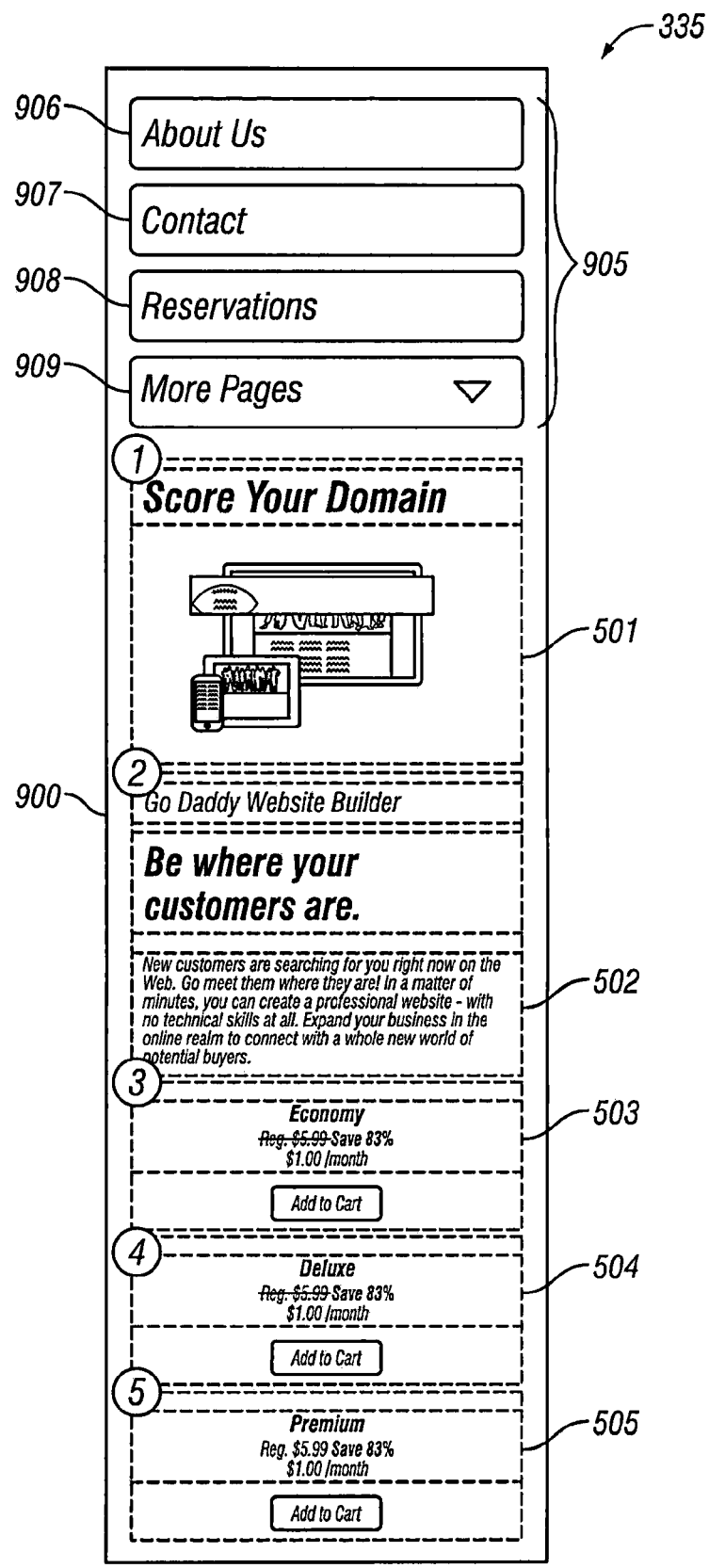
FIG. 9 is a schematic illustration of a web page converted from the web page of FIG. 2, including a primary navigation interface, and having a plurality of elements intended to be displayed on a requesting device with constrained resources.

At step 335, illustrated in FIG. 9, the web server 100 may set the primary navigation interface 905 to be displayed on the converted web page 900. The primary navigation interface includes one or more primary navigation elements 906-908. The primary navigation elements are a subset of all navigation elements on the web page 200. A navigation element is a hyperlinking element, such as an image or text selection that is tagged to take the user to another web page in the website when clicked (with a mouse input interface) or tapped (with a touch-screen interface). The primary navigation elements 906-908 are identified by identifying all navigation elements on the web page 200 and determining, by scanning the other pages in the website, which of the navigation elements are the most visible across the entire website. Navigation visibility refers to the frequency of appearance of the navigation element on all web pages in the website. The primary navigation elements are the most visible navigation elements. For many web sites, for example, the listing of primary navigation elements may include a 'home' link, a 'search' link, an 'about us' link, a 'contact us' link, and the like. The web page 200 may include any number of primary navigation elements. In some cases, however the number of primary navigation elements is limited to a fixed number of elements, such as five. In that case, the five most often occurring navigation elements are selected for inclusion in the listing of primary navigation elements.

The primary navigation elements 906-908 are removed from the normal rendering of the converted web page 900, as described above. The primary navigation elements 906-908 are inserted into the primary navigation interface 905. The primary navigation interface 905 is rendered at the top or another target area of the converted web page 900, in some cases as a static element that does not scroll with the rest of the converted web page 900. In order to conserve display space that is allotted to the rendered content, there may be a limit on the number of primary navigation elements 906-908 that are always displayed in the primary navigation interface 905. In one implementation, three primary navigation elements 906-908 are displayed at all times. The rest of the primary navigation elements may be made accessible through a list-expanding element 909. Selecting the list-expanding element 909 will cause the requesting device to display a list of additional navigation elements, which may include primary and non-primary navigation elements. So that it is always visible, a link to the "Home" web page may be separately rendered to the display or made accessible by clicking a button or performing another action supported by the general user interface of the requesting device.

Referring again to FIG. 9, the converted web page 900 has a single-column format featuring the primary navigation interface 905 at the top and the visible element groups 501-505 stacked in order of the groups' 501-505 priority on the original web page 200. In particular, the conversion method retains the contextual priority of elements on the original web page 200 regardless of the original web page's 200 layout. The groups 501-505 are rendered in containers of equal width in order to provide a consistent display on the requesting device with constrained resources 120. The preferred format of the converted web page 900 provides effective conveyance of the functional and informational content of the original web page 200, while also providing easy viewing and touch-screen manipulation on mobile devices.

With reference again to FIGS. 2 and 9, in some embodiments the original web page 200 may be populated with one or more visible or invisible standard informational elements (not shown) which it may be desirable to copy to the converted web page 900 at some point in the conversion algorithm. The standard informational elements may include design elements such as raw text, text fields, text boxes, hyperlinked graphic buttons, and the like, which convey desired identifying and contact information. The information to be conveyed may depend on the goals of the website owner.

For example, a business may wish the standard informational elements to convey the business name, address, and phone number, while an individual may wish the standard informational elements to convey only his name or an online alias by which he is known. The information to be conveyed may further include social connectors that, when clicked by a website visitor, may automatically connector the visitor with one or more of the website owner's social network presences, such as a FACEBOOK or GOOGLE+ profile, TWITTER account, BLOGGER blog, or GOOGLE PLACES or YELP listing. Collectively, the information to be conveyed may be referred to as NAPSOC ("Name, Address, Phone number, SOCial connectors") data.

Figure 10:
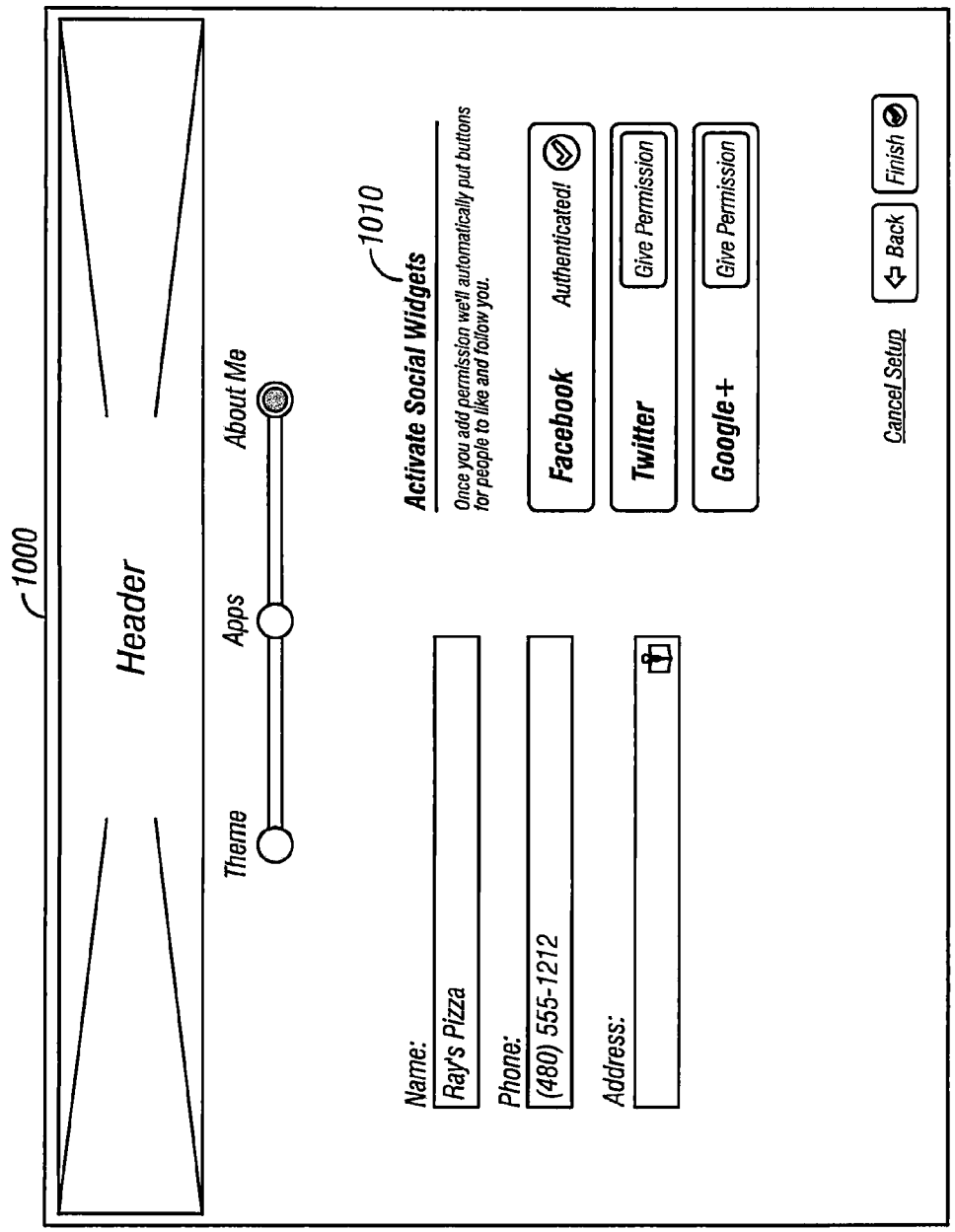
FIG. 10 is a schematic illustration of a website builder interface.

Referring to FIG. 10, the original web page may be built using a website builder software tool having an interface 1000 that prompts for entry of the business' NAPSOC data. The website builder may, upon entry of some or all of the NAPSOC data, identify one or more of the business' social networking accounts and provide a request box 1010 prompting the business to permit the website builder to insert the social connectors into the original web page. In one embodiment, the business may enter its account information, such as its TWITTER name or FACEBOOK page URL, and the website builder may use the account information to identify the corresponding accounts. In another embodiment, the website builder may search for relevant social connectors based only on the business' name, address, or other data such as business type. If the business gives permission, the website builder adds hyperlinked buttons to the relevant social network presences as design elements on the original web page. The web server may then process the hyperlinked buttons as any other design element according to the conversion algorithm described above. Alternatively, the web server may designate the social connector hyperlinked buttons as primary navigation elements and may insert them at the top of the converted web page. When using a website builder to construct a website, a mobile version of the website may be prepared in accordance with the method depicted in FIG. 3 at the time the website is published. Alternatively, if the builder allows a particular website to be exported, at that time the user may select to export a mobile version of the website, where the mobile version of the web pages making up the website have been prepared in accordance with the method described in FIG. 3.

In general, the conversion algorithm described above rearranges the layout of certain web page elements in order to be more accessible to a target device. Although the approach generally improves the readability and accessibility of a web page, in some cases a web page designer may not want a web page, or certain parts of a web page, to be modified pursuant to the present conversion algorithm. As such, certain indicators, such as database flags, HTML tags, or other code tags, may be defined that cause the conversion algorithm to not be performed on certain regions of a web page. For example, a web page may include a header that includes a number of carefully positioned image segments that, when pieced together form a larger image. If the image segments were to be re-arranged, the segments of the larger image could become disorganized. Accordingly, the portion of the web page making up the header image may be marked in a database storing the original web page 200 layout as excluded from conversion, or may be wrapped in the source code with a certain tag pair (e.g., <no-conversion> and </no-conversion>) indicating that the header portion of the web page should not be rearranged pursuant to the present method. In another example, the designer may intend certain elements to overlap on the web page 200. The designer may mark these elements as overlapping, as described above, to instruct the web server to skip the separation step 325. See FIGS. 3 and 8. In this manner, web page designers can have precise control over the portions of their websites that may be modified depending upon the capabilities of the requesting device.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As a non-limiting example, the steps described above (and all methods described herein) may be performed by any central processing unit (CPU) or processor in a computer or computing system, such as a microprocessor running on a server computer, and executing instructions stored (perhaps as applications, scripts, apps, and/or other software) in computer-readable media accessible to the CPU or processor, such as a hard disk drive on a server computer, which may be communicatively coupled to a network (including the Internet). Such software may include server-side software, client-side software, browser-implemented software (e.g., a browser plugin), and other software configurations.

The present invention has been described in terms of one or more preferred embodiments, and it should be appreciated that many equivalents, alternatives, variations, and modifications, aside from those expressly stated, are possible and within the scope of the invention.

We claim:

1. A method, comprising:
   identifying design elements in a graphical representation of a web page;
   ordering the design elements according to a position of each of the design elements with respect to a top of the graphical representation of the web page;
   grouping one or more of the ordered design elements into one or more groups of design elements;
   stacking the design elements by rearranging each group of design elements into a single column; and
   rendering the single column of the groups of design elements into a converted web page for display on a device.

2. The method of claim 1, wherein the device is a mobile device.

3. The method of claim 1, wherein one or more of the design elements is positioned on the web page using absolute positioning.

4. The method of claim 1, wherein each group of design elements includes design elements that are vertically aligned with each other in the graphical representation of the web page, and are within a threshold width variation of each other.

5. The method of claim 4, wherein the threshold width variation is 20 pixels.

6. The method of claim 5, wherein the groups of design elements are stacked in order of proximity to the top of the graphical representation of the web page.

7. A method comprising:
 identifying design elements in a graphical representation of a web page;
 ordering the design elements according to a position of each of the design elements with respect to a top of the graphical representation of the web page;
 grouping one or more of the ordered design elements into one or more groups of design elements;
 stacking the design elements in a single column, by:
  moving each group of design elements to the left in the graphical representation of the web page until the group being moved contacts a left side of the graphical representation of the web page or another group of design elements, and
  upon contact with another group of design elements, placing the group being moved below the contacted group of design elements; and
 rendering the single column of the design elements into a converted web page for display on a device.

8. The method of claim 7, including:
 identifying a primary navigation interface for the web page, the primary navigation interface including a plurality of navigation elements; and
 inserting one or more of the plurality of navigation elements into the converted web page.

9. The method of claim 8, wherein the web page is part of a website comprising a plurality of web pages, and wherein identifying the primary navigation interface includes scanning the plurality of web pages in the website to identify a navigation element included in a plurality of the web pages of the website.

10. The method of claim 8, wherein the one or more navigation elements are inserted at the top of the converted web page.

11. The method of claim 7, wherein rendering the single column of the design elements into a converted web page includes creating a container for each of the groups of design elements, and rendering the containers.

12. The method of claim 11, wherein each container has a maximum width equal to a width of a display of the device.

13. The method of claim 7, wherein the device is a mobile device.

14. The method of claim 7, wherein at least one of the design elements is positioned on the web page using absolute positioning.

15. A method for generating a converted web page, comprising:
 receiving a request for a web page from a requesting device having a first display, the web page being designed to be served to a requesting device having a second display, a width of the second display being greater than a width of the first display;
 identifying one or more design elements in a graphical layout of the web page;
 ordering the design elements according to a proximity of each of the design elements to a top of the graphical layout of the web page;
 grouping one or more of the ordered design elements into one or more groups of design elements according to a column layout;
 stacking the design elements by rearranging each group of design elements into a single column;
 setting a primary navigation interface by:
  identifying one or more navigation elements on the web page,
  determining which of the identified one or more navigation elements are primary navigation elements, and
  inserting one or more of the primary navigation elements into the primary navigation interface;
 rendering the single column of the design elements into the converted web page; and
 rendering the primary navigation interface into the converted web page.

16. The method of claim 15, wherein the design elements in the converted web page have a maximum width equal to a width of a display of the requesting device.

17. The method of claim 15, wherein the requesting device is a mobile device.

18. The method of claim 15, wherein at least one of the design elements is positioned on the web page using absolute positioning.

19. The method of claim 15, including converting the web page into the converted web page before receiving a request from the requesting device for the web page.

20. The method of claim 15, including converting the web page into the converted web page upon receiving a request from the requesting device for the web page.

* * * * *